(12) United States Patent
Liao et al.

(10) Patent No.: US 11,967,672 B1
(45) Date of Patent: Apr. 23, 2024

(54) DEVICE FOR ASSEMBLY AND DISASSEMBLY

(71) Applicant: ZHUHAI TITANS NEW POWER ELECTRONICS CO., LTD, Zhuhai (CN)

(72) Inventors: Xiaowen Liao, Zhuhai (CN); Zefeng Dong, Zhuhai (CN); Zhou Zhang, Zhuhai (CN); Yong Li, Zhuhai (CN); Liguo Qiu, Zhuhai (CN)

(73) Assignee: ZHUHAI TITANS NEW POWER ELECTRONICS CO., LTD, Zhuhai (CN)

( * ) Notice: Subject to any disclaimer, the term of this patent is extended or adjusted under 35 U.S.C. 154(b) by 0 days.

(21) Appl. No.: 18/382,641

(22) Filed: Oct. 23, 2023

Related U.S. Application Data

(63) Continuation of application No. PCT/CN2023/084235, filed on Mar. 28, 2023.

(30) Foreign Application Priority Data

Dec. 16, 2022 (CN) .......................... 202211622005.9
Dec. 16, 2022 (CN) .......................... 202223413476.7

(51) Int. Cl.
*H01M 50/256* (2021.01)
*B08B 5/04* (2006.01)
(Continued)

(52) U.S. Cl.
CPC ........... *H01M 10/0404* (2013.01); *B08B 5/04* (2013.01); *H01M 50/256* (2021.01); *H01M 50/262* (2021.01)

(58) Field of Classification Search
CPC ........... H01M 10/0404; H01M 50/262; H01M 50/256; B08B 5/04
See application file for complete search history.

(56) References Cited

FOREIGN PATENT DOCUMENTS

| CN | 206921943 U | 1/2018 |
|---|---|---|
| CN | 217788489 U | * 11/2022 |

(Continued)

OTHER PUBLICATIONS

PCT International Search Report for International Application No. PCT/CN2023/084235, dated Sep. 13, 2023, 8pp.
(Continued)

*Primary Examiner* — Lingwen R Zeng
(74) *Attorney, Agent, or Firm* — The Roy Gross Law Firm, LLC; Roy Gross

(57) ABSTRACT

A device for assembly and disassembly is provided. The device includes a support assembly, a bearing assembly, and a latching assembly. The support assembly includes a first support member and a locking assembly, the locking assembly includes a locking driver and a locking connection structure, and the locking connection structure is configured to support a negative pressure assembly. The latching assembly includes a first connection structure, a second connection structure, and a movable connection structure, wherein the first connection structure is latched with the second connection structure through the movable connection structure. The locking connection structure is separated from the negative pressure assembly while the movable connection structure is latched with the second connection structure, or the locking connection structure is connected to the negative pressure assembly while the movable connection structure is unlatched from the second connection structure.

20 Claims, 12 Drawing Sheets

(51) Int. Cl.
*H01M 10/04* (2006.01)
*H01M 50/262* (2021.01)

(56) References Cited

FOREIGN PATENT DOCUMENTS

CN 217788489 U 11/2022
JP 2022155630 A 10/2022

OTHER PUBLICATIONS

PCT Written Opinion for International Application No. PCT/CN2023/084235, dated Sep. 13, 2023, 8pp.

\* cited by examiner

DEVICE FOR ASSEMBLY AND DISASSEMBLY

CROSS-REFERENCE TO RELATED APPLICATIONS

This application is a continuation of International Application No. PCT/CN2023/084235, filed on Mar. 28, 2023, which claims priority to Chinese Patent Application No. 202211622005.9, filed on Dec. 16, 2022, titled "DEVICE FOR ASSEMBLY AND DISASSEMBLY", and Chinese Patent Application No. 202223413476.7, filed on Dec. 16, 2022, titled "CLEANING ASSEMBLY, DEVICE FOR ASSEMBLY AND DISASSEMBLY, AND FORMATION APPARATUS". All of the aforementioned applications are hereby incorporated by reference in their entireties.

TECHNICAL FIELD

The present application relates to the technical field of a production equipment for lithium battery, and more particularly, to a device for assembly and disassembly.

BACKGROUND

A device for assembly and disassembly is generally used for engaging a negative pressure assembly with a battery and installing the negative pressure assembly with a tray in which the battery is positioned, to integrate the negative pressure assembly with the tray, for such as forming, standing, and the like. After required operations, the negative pressure assembly needs to be disassembled from the tray and the battery by the device for assembly and disassembly, so that the negative pressure assembly is ready for engaging a next tray and battery.

With a conventional device for assembly and disassembly, after engaging the negative pressure assembly with the battery, a manual operation is required to lock the negative pressure assembly and the tray, which is cumbersome and inefficient. Therefore, some manufacturers use a structure such as a motor or a cylinder to automatically lock the negative pressure assembly and the tray in order to improve production efficiency and automation of the conventional device for assembly and disassembly. However, disassembling the negative pressure assembly from the conventional device for assembly and disassembly device is still problematic. Manual disassembly affects the production efficiency, however, the additionally motors or cylinders for disassembly undoubtedly increase cost on the device modification, and it is difficult for the additionally motors or cylinders to work corporately.

SUMMARY

To solve at least one of the above technical problems, the present application provides a device for assembly and disassembly and the following technical solution is provided.

The device for assembly and disassembly provided herein includes a support assembly, a bearing assembly, and a latching assembly. The support assembly includes a first support member and a locking assembly, the locking assembly includes a locking driver and a locking connection structure, the locking driver is connected with the first support member, the locking connection structure is connected with the locking driver, the locking connection structure is configured to support a negative pressure assembly, and connection between the locking connection structure and the negative pressure assembly is separable. The bearing assembly includes a bearing member for carrying a tray, the bearing member is positioned below the first support member, at least one of the bearing member and the first support member is raised and lowered in a first direction. The latching assembly includes a first connection structure configured to connect with the negative pressure assembly, a second connection structure configured to connect with the tray, and a movable connection structure movably connected with the first connection structure; the first connection structure is latched with the second connection structure through the movable connection structure, and the movable connection structure is unlatchable from the second connection structure. The locking connection structure is movable in a second direction, and the locking connection structure drives the movable connection structure to move in the second direction, and the movable connection structure is separable from the locking connection structure; wherein the locking connection structure is separated from the negative pressure assembly while the movable connection structure is latched with the second connection structure, or the locking connection structure is connected to the negative pressure assembly while the movable connection structure is unlatched from the second connection structure.

In some embodiments of the present application, the movable connection structure is provided with an abutting region on a side of the movable connection structure, and in a case that the locking connection structure is connected to the movable connection structure, the locking driver exerts a force on the abutting region through the locking connection structure to move the movable connection structure.

In some embodiments of the present application, the locking connection structure is provided with a locking fasten region, and the locking fasten region is recessed on the locking connection structure.

In some embodiments of the present application, the first connection structure is provided with a recessed latching region, the second connection structure is provided with a latching connection end, the latching connection end is provided with a recessed latching connection region, the latching connection end is extendable into the locking region in the first direction, and the movable connecting structure is fastened with an inner wall of the latching connection region or separated from the latching connection region.

In some embodiments of the present application, the latching connection region extends through the latching connection end in the second direction, a side wall of the latching connection region is provided with a first avoidance region, and the first avoidance region extends through the side wall of the locking connection region, wherein in a case that the latching connection end is separated from the latching region in the first direction, the movable connection structure is separated from the second connection structure through the first avoidance region.

In some embodiments of the present application, the movable connecting structure includes a fasten section and an avoidance section, the fasten section is connected with the avoidance section, the fasten section has a diameter greater than a diameter of the avoidance section, the fasten section is fastened with the inner wall of the latching connection region, and the avoidance section is separable from the first avoidance region; wherein the movable connection structure moves in the second direction to move the fasten section to the latching connection region or the avoidance section to the latching connection region.

In some embodiments of the present application, the latching assembly includes an elastic member connected to the movable connection structure, the elastic member exerts a reverse elastic force on the movable connection structure in a case that the avoidance section is moved in the second direction toward the latching connection region.

In some embodiments of the present application, the locking connection structure is provided with a support structure configured to support the negative pressure assembly, and the support structure is recessed on the locking connection structure.

In some embodiments of the present application, the device includes a stopper, an upper end of the stopper abuts against the first support member or a lower end of the stopper abuts against one of the negative pressure assembly, the tray and the bearing member in a case that the tray and the negative pressure assembly is raised as a whole to a position for unlatching.

In some embodiments of the present application, the device includes a cleaning assembly connected with the bearing member, the cleaning assembly includes a suction nozzle engaging structure positioned below the bearing member, the bearing member is provided with an engaging region, and the engaging region extends through the bearing member; wherein at the engaging region, the suction nozzle of the negative pressure assembly is engaged with the suction nozzle engaging structure.

In some embodiments of the present application, the cleaning assembly includes a second support member and a translating driver, the suction nozzle engaging structure is connected with the second support member, the second support member is positioned on a lower side of the bearing member, the second support member is slidably connected with the bearing member, the second support member is connected with the translating driver, and translating driver is connected with the bearing member; wherein under an actuation of the translating driver, the second support member moves the suction nozzle engaging structure to the engaging region or the second support member moves the suction nozzle engaging structure away from the engaging region.

In some embodiments of the present application, the cleaning assembly includes a translating guide structure connected with the bearing member, the translating guide structure is positioned on the lower side of the bearing member, and the second support member is slidably connected with the translating guide structure.

In some embodiments of the present application, the engaging region includes a plurality of engaging regions, and the engaging regions are arranged in an array on the bearing member; wherein the suction nozzle engaging structure includes a plurality of suction nozzle engaging structures, and the suction nozzle engaging structures are arranged in an array.

In some embodiments of the present application, the lower side of the bearing member is provided with a recessed region, the engaging region is positioned at bottom of the recessed region, and the suction nozzle engaging structure extends into the recessed region; wherein under actuation of the translating driver, the suction nozzle engaging structure moves in the recessed region to move the suction nozzle engaging structure to the engaging region or move the suction nozzle engaging structure away from the engaging region.

In some embodiments of the present application, the recessed region extends in a translation direction of the suction nozzle engaging structure to define a recessed groove, the recessed region is provided with at least two engaging regions, and the engaging regions are arranged in at least one row in the recessed region along the translation direction of the suction nozzle engaging structure.

In some embodiments of the present application, the cleaning assembly includes a shielding member slidably connected with the bearing member, the shielding member is configured to shield the suction nozzle engaging structure at the engaging region, or the shielding member is configured to move away from the engaging region to expose the suction nozzle engaging structure.

BENEFICIAL EFFECT

The embodiments of the present application have at least the following advantages: with the device for assembly and disassembly, when the locking driver drives the locking connection structure to approach and connect the negative pressure assembly, the locking connection structure drives the movable connection structure to move so as to unlatch the latching assembly, thereby synchronously realizing two actions of unlatching the latching assembly between the tray and the negative pressure assembly, and connecting the locking assembly with the negative pressure assembly. When the locking driver drives the locking connection structure away from the negative pressure assembly, the locking connection structure drives the movable connection structure to move so as to latch the latching assembly, thereby synchronously realizing two actions of latching the latching assembly between the tray and the negative pressure assembly, and separating the locking assembly from the negative pressure assembly. The present application can be widely applied to the technical field of production equipment for lithium battery, by improving the assembly and disassembly efficiency of the device for assembly and disassembly.

Figure 1:
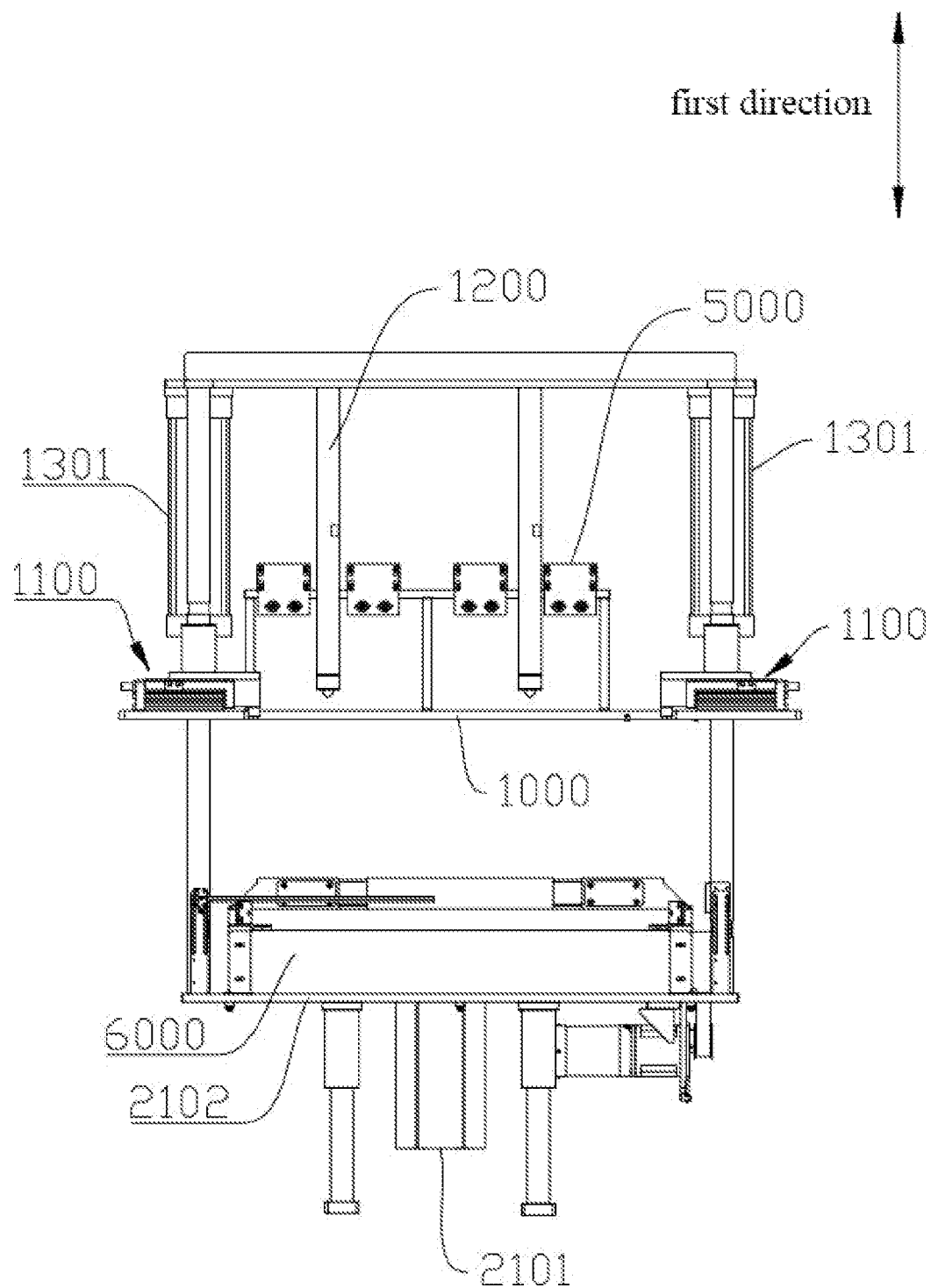
FIG. 1 is a structural schematic diagram of a device for assembly and disassembly.
Figure 2:
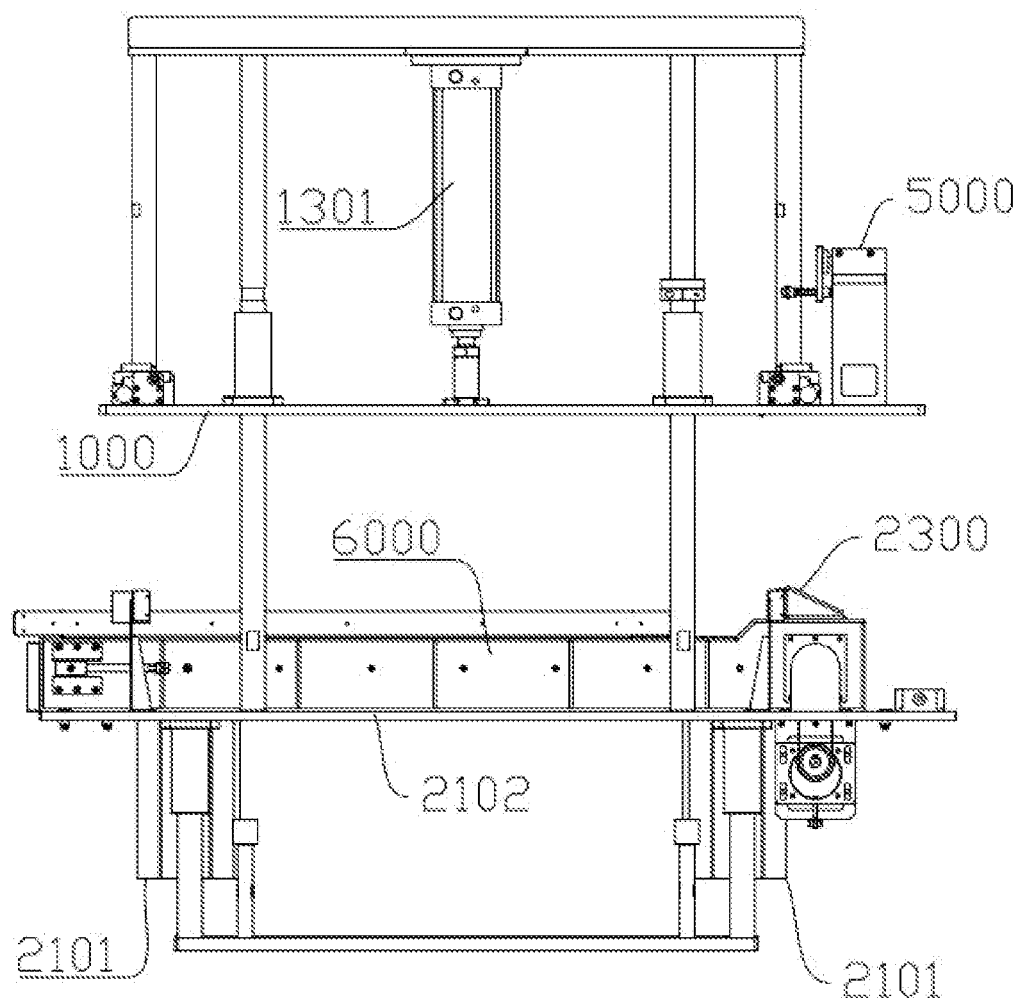
FIG. 2 is a structural schematic diagram of a device for assembly and disassembly.
Figure 3:
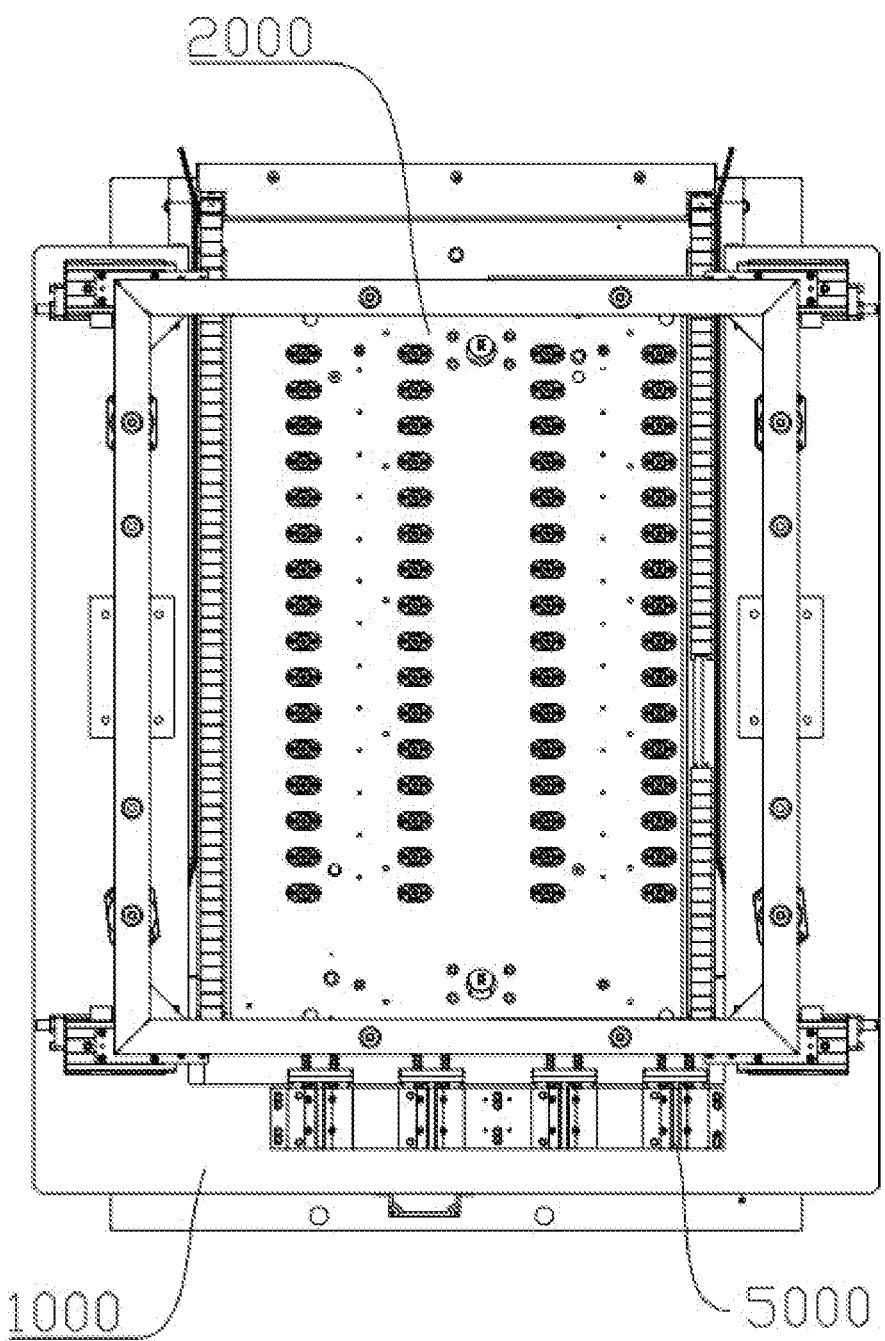
FIG. 3 is a top view of the structure of FIG. 2.
Figure 4:
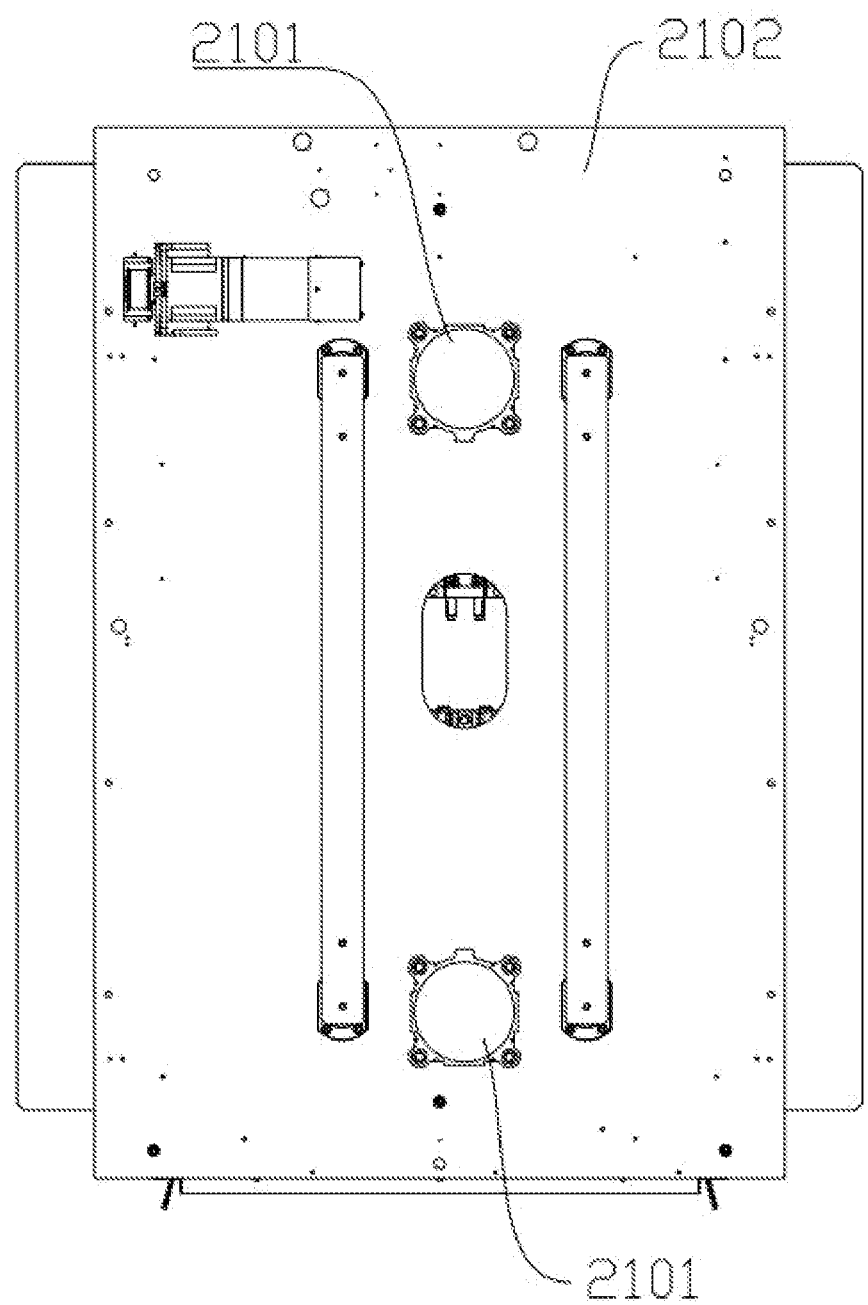
FIG. 4 is a bottom view of the structure of FIG. 2.
Figure 5:
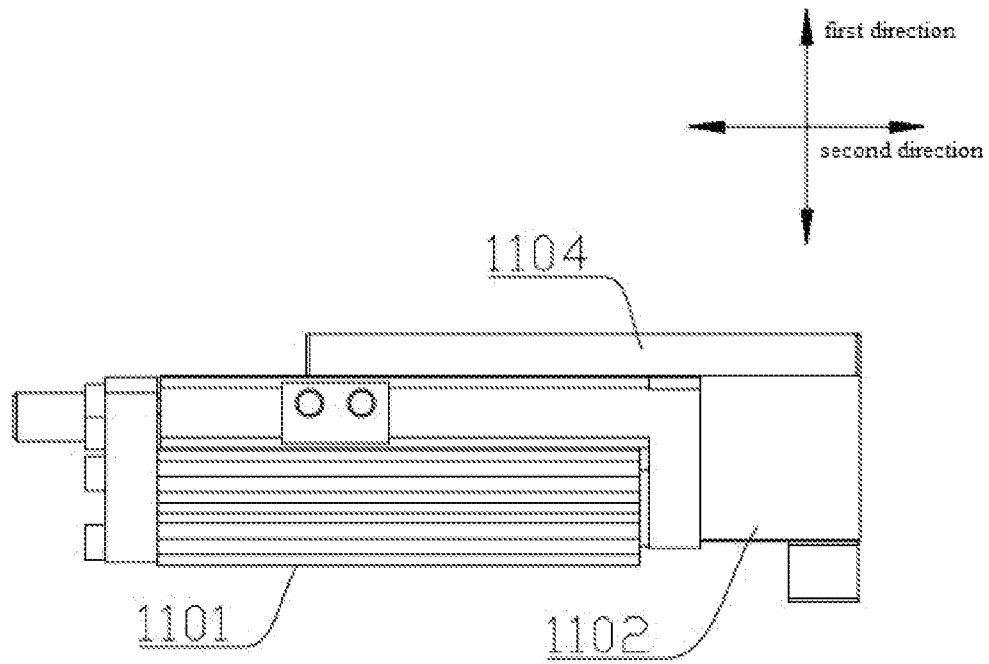
FIG. 5 is a structural schematic diagram of a locking assembly.
Figure 6:
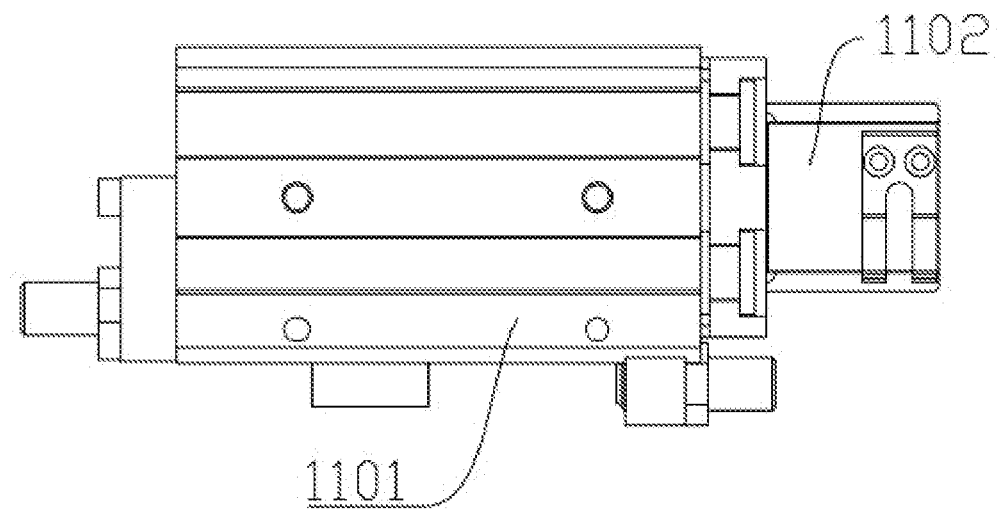
FIG. 6 is a structural schematic diagram of a locking assembly.
Figure 7:
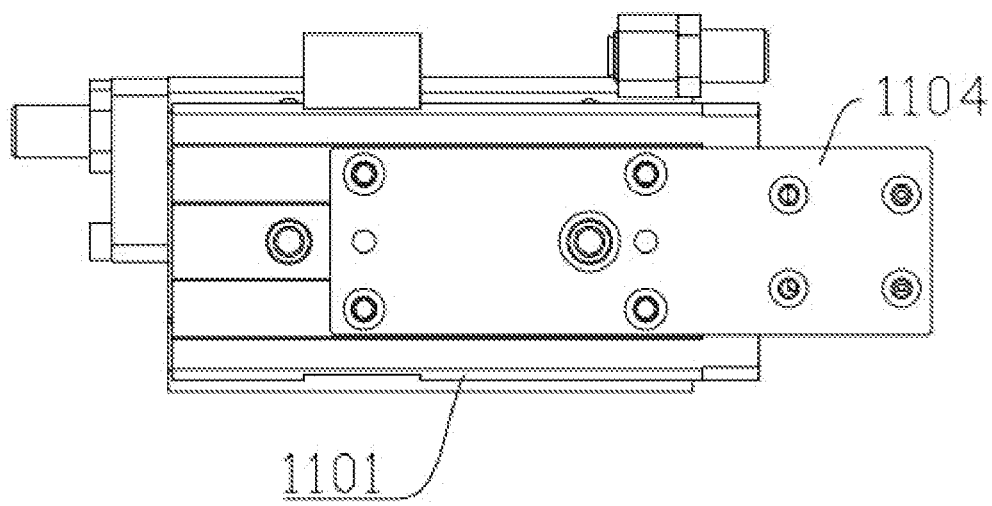
FIG. 7 is a structural schematic diagram of a locking assembly.
Figure 8:
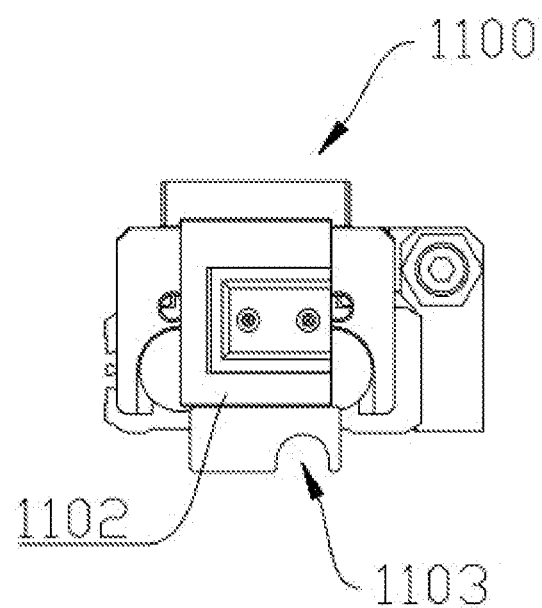
FIG. 8 is a structural schematic diagram of a locking assembly.
Figure 9:
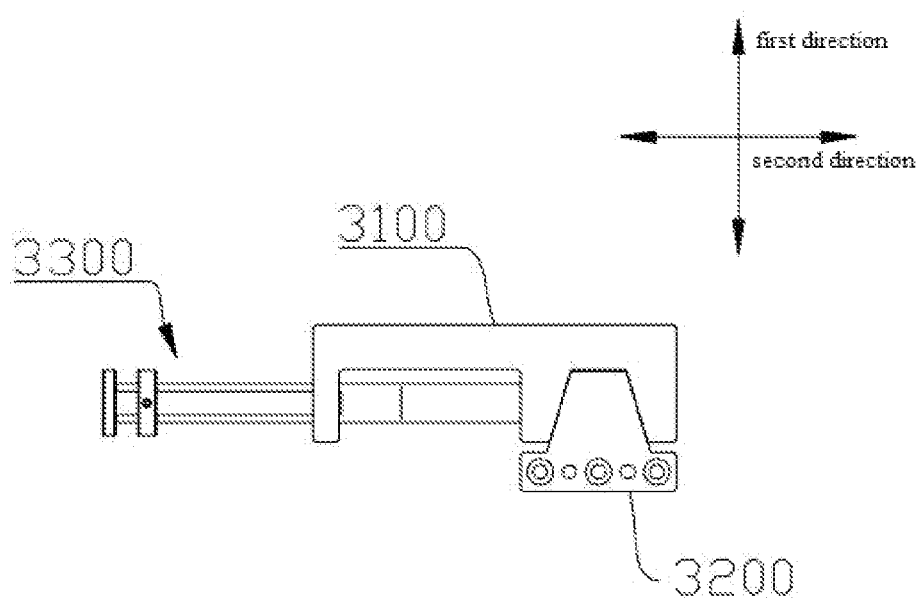
FIG. 9 is a structural schematic diagram of a latching assembly.
Figure 10:
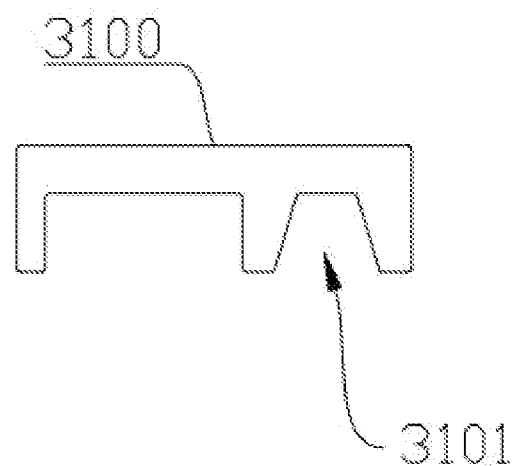
FIG. 10 is a structural schematic diagram of a first connection structure.

In the drawings: 1000. first support member; 1100. locking assembly; 1101. locking driver; 1102. locking connection structure; 1103. locking fasten region; 1104. locking guide structure; 1200. stopper; 1301. first driver; 2000. bearing member; 2001. engaging region; 2002. recessed region; 2101. raising driver; 2102. raising base; 2300. blocking member; 3100. first connection structure; 3101. latching region; 3200. second connection structure; 3201. latching connection end; 3202. latching connection region; 3203. first avoidance region; 3300. movable connection structure; 3301. abutting region; 3302. fasten section; 3303. avoidance section; 3304. connecting section; 4100. suction nozzle engaging structure; 4200, second support member; 4201. suction nozzle mounting structure; 4202. connecting member; 4301. translating driver; 4302. translating guide structure; 4400. abutting member; 5000. airtightness detecting assembly; 6000. transporting assembly.

DETAILED DESCRIPTION OF THE EMBODIMENTS

In order to make the objects, technical solutions, and advantages of the present application clearer, the present application will be described in further detail with reference to the accompanying drawings and specific embodiments. It should be understood that the specific embodiments described in this specification are for the purpose of explaining the present application only, and are not intended to limit the present application.

In the description of this application, it should be understood that the azimuth or positional relationship indicated by the terms "center", "central portion", "longitudinal", "transverse", "length", "width", "thickness", "upper", "lower", "front", "rear", "left", "right", "vertical", "horizontal", "top", "bottom", "inner", "outer", "axial", "radial", "circumferential", and the like, is based on the azimuth or positional relationship shown in the drawings, merely for ease of description of this application and simplification of the description, and is not intended to indicate or imply that the device or element referred to must have a particular azimuth, be constructed and operated in a particular azimuth, and therefore is not to be construed as limiting the application. Further, features defining by "first" and "second" may explicitly or implicitly include one or more these features. In the description of this application, unless otherwise stated, "plurality" means two or more.

In the description of the present application, it should be understood that, unless expressly stated and defined otherwise, the terms "mount", "conduct", "connect" are to be understood in a broad sense, for example, as a fixed connection, as a detachable connection, or as an integrated connection. It may be a mechanical connection. It may be directly connected or indirectly connected by means of an intermediate medium. It may be internal communication of the two elements or relative relationship of the two elements. The specific meaning of the above terms in the present application can be understood based on the specific circumstance to those of ordinary skill in the art.

Unless it is explicitly stated and defined, in the present application, the expression that the first feature is "on" or "under" the second feature may include direct contact of the first and second features, as well as contact of the first feature and second feature by additional features therebetween. The expression that the first feature is "on", "above" or "up" the second feature may include that the first feature is directly above and obliquely above the second feature, or merely indicates that the first feature is in a level higher than the second feature. The expression that the first feature is "under", "below" or "down" the second feature may include that the first feature is directly below and obliquely below the second feature, or merely indicates that the first feature level is in a level lower than the second feature.

In some embodiments, the term "parallel" refers to a state in which a straight line and a straight line, a straight line and a plane, or a plane and a plane define an angle ranging from $-1°$ to $1°$. Additionally, the term "vertical" refers to a state in which a straight line and a straight line, a straight line and a plane, or a plane and a plane define an angle ranging from $89°$ to $91°$. The expression that the distances or the angles are equal means that the tolerance between the distances or the angles ranges from $-1\%$ to $1\%$.

The present application relates to a device for assembly and disassembly. The device for assembly and disassembly includes a support assembly, a bearing assembly, and a latching assembly. The support assembly is used for supporting a negative pressure assembly. The bearing assembly is used for carrying a tray, and the bearing assembly is positioned below the support assembly. The latching assembly is used for latching the negative pressure assembly with the tray. The negative pressure assembly is separable from the support assembly, so that the negative pressure assembly latched with the tray is separable from the device for assembly and disassembly.

Referring to FIG. 1 to FIG. 4, a support assembly includes a first support member 1000 and a locking assembly 1100. A device for assembly and disassembly includes a frame, and the first support member 1000 is connected to the frame of the device for assembly and disassembly. The first support member 1000 is provided as a support plate. The locking assembly 1100 includes a locking driver 1101 and a locking connection structure 1102, the locking driver 1101 is connected with the first support member 1000, the locking connection structure 1102 is connected with the locking driver 1101, and the locking connection structure 1102 is used to support a negative pressure assembly for connecting the negative pressure assembly to the device for assembly and disassembly. It should be understood that the connection between the locking connection structure 1102 and the negative pressure assembly may be released to separate the negative pressure assembly from the device for assembly and disassembly.

Specifically, under actuation of the locking driver 1101, the locking connection structure 1102 can be moved in a second direction to close to the negative pressure assembly. The locking connection structure 1102 is connected with the negative pressure assembly to function as a support. Accordingly, in a case that the locking connection structure 1102 is moved reversely, the locking connection structure 1102 is moved away from the negative pressure assembly to separate from the negative pressure assembly.

It should be understood that the bearing assembly includes a bearing member 2000 for a carrying tray. The bearing member 2000 is provided as a bearing plate, and is positioned below the first support member 1000. Further, at least one of the bearing member 2000 and the first support member 1000 can be raised and lowered in the first direction so that the tray and the negative pressure assembly are brought close to or away from each other. The first direction is a vertical direction.

Referring to FIG. 9 to FIG. 12, the latching assembly includes a first connection structure 3100 for connecting the negative pressure assembly, a second connection structure 3200 for connecting the tray, and a movable connection structure 3300 for movably connecting with the first connection structure 3100 and for fastening with the second connection structure 3200. Specifically, the first connection structure 3100 is connected to the second connection structure 3200 by the movable connection structure 3300 so as to latch the latching assembly, thereby realizing latching and fixing between the negative pressure assembly and the tray, and keeping the negative pressure assembly in engagement with the battery in the tray. It should be understood that the latching connection between the movable connection structure 3300 and the second connection structure 3200 may be released to unlatch the latching assembly, so that the negative pressure assembly is separated from the tray.

Further, under actuation of the locking driver 1101, the locking connection structure 1102 can exert a force on the movable connection structure 3300, so that the locking connection structure 1102 can move the movable connection structure 3300 in the second direction. As such, the latching assembly can synchronously latch the negative pressure assembly with the tray during the separate of the locking connection structure 1102 from the negative pressure assembly. Alternatively, the latching assembly can synchronously unlatch during the connection of the locking connection structure 1102 to the negative pressure assembly. It should be understood that the locking connection structure 1102 can: lock and connect the negative pressure assembly with the device for assembly and disassembly, and unlock and separate the negative pressure assembly from the device; and latch or unlatch the negative pressure assembly with the tray.

Specifically, in a case that the locking connection structure 1102 is gradually moved away from the negative pressure assembly, the latching connection between the movable connection structure 3300 and the second connection structure 3200 is performed while being driven by the locking connection structure 1102, thereby synchronous latching of the latching assembly. Accordingly, in a case that the locking driver 1101 drives the locking connection structure 1102 to gradually approach and support the negative pressure assembly, the locking connection structure 1102 can also move the movable connection structure 3300 at the same time, so that the latching connection between the movable connection structure 3300 and the second connection structure 3200 is released, thereby realizing synchronous unlatching of the latching assembly.

It should be understood that the connection between the locking connection structure 1102 and the movable attachment structure 3300 may be released, so that the latching assembly is separated from the locking assembly 1100. In this case, since the tray is latched and connected to the negative pressure assembly before, the tray and the negative pressure assembly can move together.

In an embodiment, the first connection structure 3100 is provided with a recessed latching region 3101, the second connection structure 3200 is provided with a latching connection end 3201, and the latching connection end 3201 can extend into the latching region 3101 in the first direction as the tray rises in the first direction with the bearing member 2000. It should be understood that the shape of the latching connection end 3201 matches the shape of the latching region 3101, thereby preventing the latching connection end 3201 from shaking and offsetting in the latching region 3101, thereby improving stability.

Figure 12:
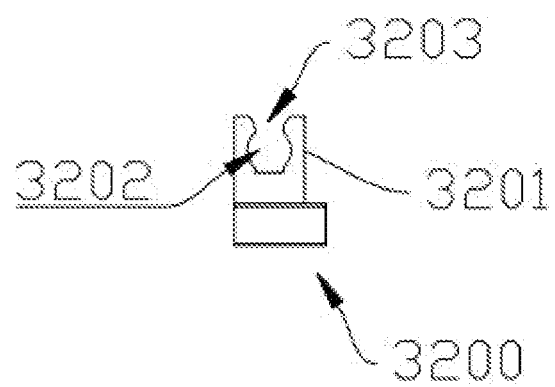
FIG. 12 is a structural schematic diagram of a second connection structure.

Referring to FIG. 12, the latching connection end 3201 is provided with a recessed latching connection region 3202, and the movable connection structure 3300 enters the latching connection region 3202 as the tray rises in the first direction with the bearing member 2000. Further, after the tray is raised to the position to connect with the negative pressure assembly, the movable connection structure 3300 is moved to fasten with the inner wall of the latching connection region 3202, or the movable connection structure 3300 is released the fastening from the inner wall of the latching connection region 3202.

It should be understood that after the movable connection structure 3300 is released the fastening from the inner wall of the latching connection region 3202, the tray is lowered in the first direction with the bearing member 2000, the latching connection end 3201 is withdrawn from the latching region 3101, and the movable connection structure 3300 is withdrawn from the latching connection region 3202. As such, the movable connection structure 3300 is released from the second connection structure 3200 so that the tray is separated from the negative pressure assembly.

In an embodiment, the latching connection region 3202 extends through the latching connection end 3201 in the second direction, and the movable connection structure 3300 is provided as a rod-like structure. On the first connection structure 3100, the axial direction of the movable connection structure 3300 is provided as the second direction, and the movable connection structure 3300 can be reciprocated in the second direction, so that the movable connection structure 3300 can be reciprocated in the latching connection region 3202. It should be understood that the movable connection structure 3300 is moved in the second direction, and the relative positions of the movable connection structure 3300 and the latching connection region 3202 can be changed to latch or unlatch the movable connection structure 3300 with the latching connection region 3202.

Further, the side wall of the latching connection region 3202 is provided with a first avoidance region 3203, and the first avoidance region 3203 extends through the side wall of the latching connection region 3202 in the first direction. Both ends of the first avoidance region 3203 extend to the edges of the latching connection region 3202 in the second direction, respectively. Referring to FIG. 12, the first avoidance region 3203 defines an opening at the latching connection end 3201.

It should be understood that, in the case where the latching connection end 3201 is withdrawn from the latching region 3101 in the first direction and the latching connection end 3201 is separated from the latching region 3101, the movable connection structure 3300 is withdrawn from the latching connection region 3202 through the first avoidance region 3203. As such, the movable connection structure 3300 is released from the second connection structure 3200. Accordingly, in a case that the latching connection end 3201 enters the latching region 3101 in the first direction, the movable connection structure 3300 enters the latching connection region 3202 through the first avoidance region 3203.

Figure 11:
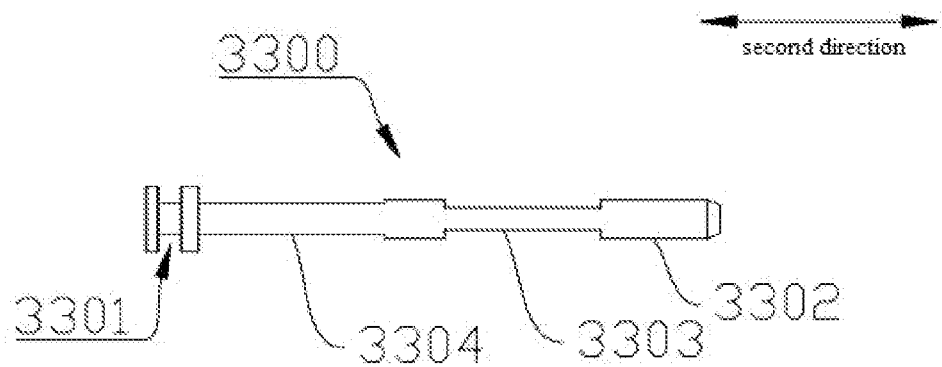
FIG. 11 is a structural schematic diagram of a movable connection structure.

Referring to FIG. 11, the movable connection structure 3300 includes a fasten section 3302 and an avoidance section 3303, and the fasten section 3302 and the avoidance section 3303 are arranged along the axial direction of the movable connection structure 3300. The fasten section 3302 is connected with the avoidance section 3303, the fasten section 3302 can be fastened with the inner wall of the latching connection region 3202, and the avoidance section 3303 can be separated from the first avoidance region 3203. It should be understood that, as the movable connection structure 3300 is moveable in the second direction, the fasten section 3302 is moved to the latching connection region 3202 for latching, or the avoidance section 3303 is moved to the latching connection region 3202 for unlatching.

Further, the diameter of the fasten section 3302 is greater than the diameter of the avoidance section 3303. Specifically, the movable connection structure 3300 is provided as a stepped shaft or cylindrical bolt, and the cross-sections of the fasten section 3302 and the avoidance section 3303 are circular. Alternatively, for ease of processing, the cross-section of the fasten section 3302 is rectangular or strip-shaped, and the cross-section of the avoidance section 3303 is circular. It should be understood that the width between the two opposing side walls of the first avoidance region 3203 is not less than the diameter of the avoidance section 3303, and the width between the two opposing side walls of the first avoidance region 3203 is less than the diameter of the fasten section 3302.

Referring to FIG. 12, the latching connection region 3202 is provided as a circular groove, and the diameter of the cross-section of the latching connection region 3202 is equal to or slightly greater than the diameter of the fasten section 3302, so that the gap between the outer peripheral contour of the fasten section 3302 and the inner wall of the latching connection region 3202 is reduced, thereby preventing vibration, and improving the stability of the fastening. Further, the width between the two opposite side walls of the first avoidance region 3203 is less than the diameter of the cross-section of the latching connection region 3202. In this case, a limiting structure is defined between the side walls of the first avoidance region 3203 and the side walls of the fasten region 3202. The limiting structure abuts against the side of the fasten section 3302, so that the movable connection structure 3300 can be prevented from separating from the first avoidance region 3203 and the second connection structure 3200, thereby realizing fastening.

As an alternative, in some examples, the cross-section of the latching connection region 3202 is provided as a regular polygon, and in this case, the diameter of the latching connection region 3202 refers to the diameter of the inscribed circle of the regular polygon. In some examples, the cross-sections of the fasten section 3302 and the avoidance section 3303 are provided as regular polygons, and in this case the diameters of the fasten section 3302 and the avoidance section 3303 refer to the diameters of the circumcircles of the regular polygons.

In an embodiment, the latching assembly includes an elastic member connected to the movable connection structure 3300, and the elastic member can exert a force on the movable connection structure 3300 and the first connection structure 3100, respectively. Specifically, in the second direction, the elastic member can exert a reverse elastic force to the movable connection structure 3300 in a case that the avoidance section 3303 is moved toward the latching connection region 3202. It should be understood in a case that the latching assembly is latched, the elastic member can prevent the avoidance section 3303 of the movable connection structure 3300 from moving to the first avoidance region 3203, thereby preventing accidental unlatching.

Further, the elastic member is provided as a compression spring, and the elastic member is sleeved on the movable connection structure 3300. Specifically, the movable connection structure 3300 includes a connecting section 3304 on which the elastic member is sleeved. In connection with FIG. 11, in the second direction, the connecting section 3304, the avoidance section 3303, and the fasten section 3302 are sequentially connected. The fasten section 3302 is close to the first end of the movable connection structure 3300, and the connecting section 3304 is close to the second end of the movable connection structure 3300.

As the locking connection structure 1102 moves the movable connection structure 3300, the locking connection structure 1102 is connected with the second end of the movable connection structure 3300. Specifically, in a case that the movable connection structure 3300 is released from fastening with the second connection structure 3200 under actuation of the locking connection structure 1102, the direction of the force exerted by the locking connection structure 1102 on the movable connection structure 3300 is from the second end of the movable connection structure 3300 to the first end of the movable connection structure 3300 in the second direction. The locking connection structure 1102 pushes the movable connection structure 3300, and the avoidance section 3303 in the movable connection structure 3300 moves to the locking connection region 3202 of the locking connection end 3201. At this time, since the elastic member is in a compressed state, and the elastic force exerted by the elastic member on the movable connection structure 3300 is from the first end to the second end. In a case that the movable connection structure 3300 is latched and fastened with the second connection structure 3200 as the locking connection structure 1102 is pulled in the reverse direction, the movable connection structure 3300 is moved, and the fasten section 3302 is moved to the latching connection region 3202 of the latching connection end 3201. At this time, the elastic member can prevent the avoidance section 3303 of the movable connection structure 3300 from moving to the first avoidance region 3203, thereby preventing an accidental unlatching.

In some examples, the first connection structure 3100 is provided with a mounting hole extending in the second direction, specifically, the mounting hole extends through side walls on both sides of the latching region 3101. It should be understood that the movable connection structure 3300 is inserted into the mounting hole. On the side of the first connecting structure 3100 outside the second end of the movable connecting structure 3300, an end of the elastic member abuts against the outer side of the first connecting structure 3100, and the other end of the elastic member exerts a force on the movable connection structure 3300 to generate a force in the second direction from the first end to the second end of the movable connection structure 3300.

Alternatively, the mounting hole may be designed to extend through the side walls of the latching region 3101 close to the second end of the movable connection structure 3300, while the side walls of the latch region 3101 close to the first end of the movable connection structure 3300 is not extended by the mounting hole. The depth of the hole formed in the side walls of the latching region 3101 close to the first end of the movable connection structure 3300 is sufficient to receive the fasten section 3302.

In an embodiment, the movable connection structure 3300 is provided with an abutting region 3301, and the abutting region 3301 is close to the second end of the movable connection structure 3300. In the case where the locking connection structure 1102 is connected to the movable connection structure 3300, the locking driver 1101 exerts a force on the abutting region 3301 through the locking connection structure 1102 to move the movable connection structure 3300.

The abutting region 3301 is positioned on the side of the movable connecting structure 3300, and in particular, the abutting region 3301 includes a recessed shoulder or protruding annular flange, it should be understood that the recessed shoulder or protruding annular flange is positioned on the side of the connecting section 3304 on the movable connecting structure 3300. Referring to FIG. 11, two protruding annular flanges are provided on the side adjacent to the second end of the movable connecting structure 3300, and the region between the two annular flanges serves as the abutting region 3301. The locking connecting structure 1102 can exert a force on the annular flanges on the side of the abutting region 3301 under the actuation of the locking driver 1101.

It should be understood that in some examples, where the movable connection structure 3300 is provided with the elastic member, the annular flange of the abutting region 3301 may abut against the elastic member, so that the elastic member exerts an elastic force on the movable connection structure 3300. Specifically, the elastic member is positioned between the annular flange and the outer side of the first connecting structure 3100, and the force of the elastic member to the annular flange is directed in the second direction from the first end of the movable connecting structure 3300 to the second end of the movable connecting structure 3300.

Further, the locking connection structure 1102 is provided with a locking fasten region 1103 corresponding to the abutting region 3301, and the locking fasten region 1103 is recessed on the locking connection structure 1102. Specifically, the locking fasten region 1103 is recessed on the locking connection structure 1102 in a direction away from the tray. It should be understood that the inner wall of the locking fasten region 1103 abuts against the side of the connection section 3304 at the abutting region 3301, thereby preventing the locking connection structure 1102 from being offset from the movable connection structure 3300 and improving the stability. Generally, the battery is positioned below the suction nozzle of the negative pressure assembly, and the battery is moved to the negative pressure assembly and engaged with the negative pressure assembly, thus, the lower portion of the locking connection structure 1102 is used to abut against the movable connection structure 3300. Accordingly, the locking fasten region 1103 is defined in a recessed shape on the lower side of the locking connection structure 1102.

In some examples, in a case that the abutting region 3301 is provided as a shoulder defined by the side depression of the connecting section 3304, in this case, it is necessary to provide an additional annular flange on the side of the connecting section 3304 for abutting the elastic member, and the annular flange is positioned between the outer side of the first connecting structure 3100 and the abutting region 3301.

In an embodiment, the locking assembly 1100 includes a locking guide structure 1104 slidably connected to the locking connection structure 1102. It should be understood that under the actuation of the locking driver 1101, the locking connection structure 1102 moves along the locking guide structure 1104 to approach or away from the negative pressure assembly to improve the smoothness of movement of the locking connection structure 1102 and prevent offsetting.

Specifically, the locking guide structure 1104 is fixedly connected to the housing of the locking driver 1101, and further, the locking guide structure 1104 includes a guide rail or a guide groove.

In an embodiment, the device for assembly and disassembly includes a stopper 1200. The positions of the movable connection structure 3300 and the locking connection structure 1102 are accurately positioned by the stopper 1200 in a case where the negative pressure assembly and the tray need to be unlatched. As such, the locking connection structure 1102 can move the movable connection structure 3300. Specifically, the lower end of the stopper 1200 is used to abut one of the negative pressure assembly, the tray, and the bearing member 2000, when the tray and the negative pressure assembly as a whole is raised to the unlatched position. At this time, the movable connection structure 3300 is connected to the locking connection structure 1102, and specifically, the side of the connecting section 3304 at the abutting region 3301 is in contact with the inner wall of the locking fasten region 1103.

It should be noted that the term "unlatched position" in the aforementioned expression "the tray and the negative pressure assembly as a whole is raised to the unlatched position" refers to a position where the latching assembly is raised to be unlatched.

It should be understood that the stopper 1200 is connected to the frame, or the stopper 1200 is connected to the first support member 1000. In some examples, the stopper 1200 is provided as a stopping post, and the upper end of the stopping post is connected to the frame or the first support member 1000.

As an alternative, the upper end of the stopper 1200 may be used to abut the first support member 1000 when the tray and the negative pressure assembly as a whole is raised to the unlatched position. In this case, the stopper 1200 is connected to the bearing member 2000, specifically, the stopper 1200 is provided on the upper side of the bearing member 2000, and the upper end of the stopper 1200 is used to abut against the lower side of the first support member 1000.

In an embodiment, the bearing member 2000 can be raised and lowered. Specifically, the device for assembly and disassembly includes a raising assembly connected to the frame of the device, the bearing member 2000 is connected to the raising assembly, and the raising assembly is used for driving the bearing member 2000 to be raised and lowered. It should be understood that the raising assembly includes a raising driver 2101 connected to the frame, the bearing member 2000 is connected to the raising driver 2101, and the raising driver 2101 is positioned below the bearing member 2000. Specifically, the raising driver 2101 includes a motor or a cylinder or a hydraulic cylinder.

With reference to FIG. 1 to FIG. 4, the frame of the device for assembly and disassembly is provided with a raising base 2102, the raising base 2102 is connected to the frame and positioned at the bottom of the frame, and the raising driver 2101 is connected to the raising base 2102. In some examples, for providing sufficient power and ensuring smooth raising of the bearing member 2000, the raising driver 2101 is provided with at least two. In some examples, two raising drivers 2101 are provided, and two raising drivers 2101 respectively connected with the lower sides of both ends of the bearing member 2000.

For further smooth raising of the bearing member 2000, the raising assembly may include a raising guide structure connected to the frame, and the raising guide structure may include a plurality of raising guide structures. The bearing member 2000 is slidably connected to the raising guide structure. Specifically, the raising guide structure includes a guide rod, and the bearing member 2000 is provided with a bushing or a linear bearing. Alternatively, it may be designed that the raising guide structure includes a guide rail, and the bearing member 2000 is slidably connected to the guide rail by a slider.

Further, the first support member 1000 can be raised, and it is understood that the first support member 1000 and the bearing member 2000 can be moved toward each other synchronously, or the first support member 1000 and the bearing member 2000 can be moved away from each other synchronously.

Specifically, the device for assembly and disassembly includes a first drive assembly connected with the frame, the first support member 1000 is connected with the first drive assembly, and the first drive assembly is used for driving the first support member 1000 to be raised and lowered. It should be understood that the first drive assembly includes a first driver 1301 connected with the frame, the first support member 1000 is connected with the first driver 1301, and the first driver 1301 is positioned above the first support member 1000. Further, the first driver 1301 includes a motor or a cylinder or a hydraulic cylinder.

It should be understood that for providing sufficient power and ensuring smooth raising of the first support member 1000 and the negative pressure assembly, the first driver 1301 is provided with at least two. In some examples, the first driver 1301 is provided with two.

In order to further smoothly raise the first support member 1000, the first drive assembly is designed to include a first guide structure connected to the frame, the first guide structure is provided as a plurality, and the first support member 1000 is slidably connected to the first guide structure. Specifically, the first guide structure includes a guide rod, and the first support member 1000 is provided with a bushing or a linear bearing. Alternatively, the first guide structure may include a guide rail, and the first support member 1000 is slidably connected to the guide rail by a slider.

In some examples, the bearing member 2000 and the first support member 1000 share a guide structure, and in particular, the bearing member 2000 and the first support member 1000 share the same guide rod to achieve guide for raising. In this case, there are at least the following advantages: simplifying the structure, saving costs, and facilitating accurate positioning of the negative pressure assembly and the tray with the battery.

With respect to the raising of the bearing member 2000 and the first support member 1000, it is also alternatively designed that, in some examples, the bearing member 2000 can be raised and lowered, and the first support member 1000 cannot be raised and lowered. In some examples, the first support member 1000 can be raised and lowered, and the bearing member 2000 cannot be raised and lowered.

In an embodiment, the first support member 1000 is provided with a second avoidance region extending through the first support member 1000 in the first direction, so that the negative pressure assembly can be connected to the battery and the tray, and the negative pressure assembly can be removed from the first support member 1000. Further, the second avoidance region defines an opening at the edge of the first support member 1000 to facilitate access of the negative pressure assembly to and from the second avoidance region.

It should be understood that a plurality of locking assemblies 1100 are provided along the edge of the second avoidance region, and the locking driver 1101 in the locking assembly 1100 is mounted to the locking connection structure 1102 by the locking guide structure 1104. Accordingly, a plurality of latching assemblies is provided, and the number of the latching assembly is consistent with the number of the locking assembly, and the position of the latching assembly corresponds to the position of the locking assemblies 1100.

Referring to FIG. 1 to FIG. 4, the locking assembly 1100 is provided with four, respectively at four corners of the second avoidance region, and the four locking assemblies 1100 support four positions of the negative pressure assembly, respectively. Accordingly, the locking assembly 1100 is provided with four.

It should be understood that, in each latching assembly, the second direction is the direction along the length of the movable connection structure 3300. Therefore, in a case that the orientation of the latching assembly is changed, the second direction is changed along with. The second direction is the direction along the length of the movable connection structure 3300.

In an embodiment, the locking connection structure 1102 is provided with a support structure for supporting the negative pressure assembly. It should be understood that the connection between the support structure and the negative pressure assembly is releasable.

Specifically, the support structure is recessed on the locking connection structure 1102, and the support structure is recessed on the locking connection structure 1102 to define a side opening. In a case that the locking connection structure 1102 moves in the second direction close to the negative pressure assembly, the surface of the negative pressure assembly can be inserted with the support structure.

In some examples, in a case that a plurality of negative pressure assemblies is supported in the device for assembly and disassembly, the negative pressure assemblies are connected to each other by a mounting structure or the negative pressure assemblies are provided on a mounting seat. In this case, the mounting structure or the mounting seat can be inserted with the support structure, and the support structure can support the negative pressure assemblies. It should be understood that in this case, the first connection structure 3100 is provided on the mounting structure or on the mounting seat.

In an embodiment, the device for assembly and disassembly includes an airtightness detecting assembly 5000 externally connected to the negative pressure source, the airtightness detection module 5000 is connected to the first support member 1000 or the frame of the device for assembly and disassembly. It should be understood that after the suction nozzle of the negative pressure module is engaged with the liquid injection port of the battery, the airtightness detecting assembly 5000 performs airtightness detection on the negative pressure module and the battery as a whole.

Specifically, the airtightness detecting assembly 5000 is provided with at least one, and the airtightness detecting assembly 5000 includes a take-electrode column, a detecting connection tube, and an airtightness detecting driver. The take-electrode column and the detecting connection tube are respectively connected to the airtightness detecting driver. It is understood that the take-electrode column and the detecting connection tube are driven by the airtightness detecting driver to respectively connect with the negative-pressure assembly. The structure of the airtightness detecting assembly 5000 is described in detail in the related art, and details are not described herein.

In an embodiment, the device for assembly and disassembly includes a transporting assembly 6000, the transporting assembly 6000 transports the tray onto the bearing member 2000, or removes the tray on the bearing member 2000 away. In particular, the transport assembly 6000 includes a transport chain or transport roller.

It should be understood that the transporting assembly 6000 conveys the tray carrying the battery to the bearing member 2000, so that the battery can be engaged with the negative pressure assembly, and the tray can be connected to the negative pressure assembly. The transporting assembly 6000 conveys the tray connected with the negative pressure assembly away from the bearing member 2000, to complete standing or charging/discharging. The transporting assembly 6000 transfers the tray connected with the negative pressure assembly to the bearing member 2000, so that the battery can be separated from the negative pressure assembly, and the tray can be separated from the negative pressure assembly, and the transport assembly 6000 conveys the tray carrying the battery away from the bearing member 2000.

Further, the device for assembly and disassembly includes a blocking member 2300, the blocking member 2300 is connected with the frame or with the bearing member 2000, and the blocking member 2300 includes a stopping block or a baffle. Specifically, when the transporting assembly 6000 feeds the tray to the bearing member 2000, the blocking member 2300 abuts against the side of the tray to indicate that the tray is transported in place. At this time, the tray is positioned above the bearing member 2000, and the transporting assembly 6000 stops running. It should be understood that the transporting assembly 6000 feeds the tray from one side of the device for assembly and disassembly, and the blocking member 2300 is positioned on the other side of the dismounting device.

In an embodiment, the device for assembly and disassembly includes a cleaning assembly, and the cleaning assembly is used for cleaning the negative pressure assembly. Specifically, the first support member 1000 is used to support a negative pressure assembly, and the cleaning assembly is positioned below the first support member 1000. After the tray is fed from the bearing member 2000, the cleaning assembly on the bearing member 2000 is engaged with the negative pressure assembly on the first support member 1000 to complete the cleaning of the negative pressure assembly. Then, the cleaning assembly is separated from the negative pressure assembly, and the negative pressure assembly can be put into use for the next time.

It should be understood that, on one hand, the bearing member 2000 may be used to support the tray, and, on the other hand, the bearing member 2000 may be used to mount the cleaning assembly. In this case, it is possible to improve the utilization rate of the bearing member 2000, save the space occupied by the cleaning assembly in the device for assembly and disassembly, simplify the operation of the device for assembly and disassembly in cleaning the negative pressure assembly, and improve the efficiency. In addition, in the related art, a stacker or a conveying line is used to feed a cleaning tool into the device for assembly and disassembly, and then the cleaning tool is removed after the cleaning is completed. In contrast, the device for assembly and disassembly designed in the present application does not need to be additionally provided with a special stacker or a conveying line and a tool storage region in a plant, thereby reducing costs and reducing occupied space of the plant.

The cleaning assembly is connected with the bearing member 2000, the bearing member 2000 can be raised and lowered in the first direction to bring the cleaning assembly close to or away from the negative pressure assembly, thereby engaging the cleaning assembly with the negative pressure assembly or separating the cleaning assembly from the negative pressure assembly. It should be noted that the first direction is a vertical direction.

The tray carried the battery is conveyed to the bearing member 2000 through the transporting assembly 6000, the suction nozzle of the negative pressure assembly is engaged with the battery, and the negative pressure assembly is latched with the tray. The negative pressure assembly is separated from the device for assembly and disassembly, and the transporting assembly 6000 conveys the negative pressure assembly and the tray out. After standing or charging and discharging, the negative pressure assembly and the tray are fed back to the device for assembly and disassembly. Then, the negative pressure assembly is separated from the tray and the battery in the tray, and the negative pressure assembly is connected with the first supporting member 1000. The transporting assembly 6000 conveys the tray and the battery out, and the cleaning assembly is engaged with the suction nozzle of the negative pressure assembly. Then, the cleaning is completed, and the cleaning assembly is separated from the negative pressure assembly.

The cleaning assembly includes a suction nozzle engaging structure 4100 positioned below the bearing member 2000. Referring to FIG. 13 to FIG. 16, the bearing member 2000 is provided as a bearing plate. The bearing member 2000 is provided with an engaging region 2001 that extends through the bearing member 2000. Specifically, the engaging region 2001 extends through the upper side and the lower side of the bearing member 2000. It should be understood that at the engaging region 2001, the suction nozzle engaging structure 4100 engages with the section nozzle of the negative pressure assembly, and the engagement between the suction nozzle engaging structure 4100 and the negative pressure assembly is separable.

Further, the cleaning assembly includes a second support member 4200, and the suction nozzle engaging structure 4100 is connected with the second support member 4200. The second support member 4200 is positioned on the lower side of the bearing member 2000, the second support member 4200 is slidably connected to the bearing member 2000, and the second support member 4200 can move the suction nozzle engaging structure 4100.

Specifically, at the lower side of the bearing member 2000, in a case that the negative pressure assembly needs to be cleaned, the second support member 4200 moves in the third direction, and the suction nozzle engaging structure 4100 moves to the engaging region 2001. After cleaning the negative pressure assembly and separating the suction nozzle engaging structure 4100 from the negative pressure assembly, the second support member 4200 is moved reversely in the third direction, and the suction nozzle engaging structure 4100 is moved away from the engaging region 2001, so that the suction nozzle engaging structure 4100 is positioned far away from the engaging region 2001. The position of the suction nozzle engaging structure 4100 is offset from the engaging region 2001, and the suction nozzle engaging structure 4100 is shielded by the bearing member 2000 to prevent dust particles from entering the suction nozzle engaging structure 4100 and prevent the cleaning effect from being affected.

In some examples, in a case that the bearing member 2000 can be raised and lowered, the suction nozzle engaging structure 4100 is removed from the engaging region 2001, and the suction nozzle engaging structure 4100 can be prevented from being damaged by collision.

It should be noted that the lower side of the bearing member 2000 is higher than the top of the suction nozzle engaging structure 4100 so as to prevent the suction nozzle engaging structure 4100 from colliding with the bearing member 2000 and preventing the suction nozzle engaging structure 4100 from being damaged. The second direction and the third direction may be the same or different, wherein "the same or different" refers to whether the two directions are parallel or not.

It should be understood that the cleaning assembly includes a translating driver 4301, and the second support member 4200 is connected with the translating driver 4301. Under the actuation of the translating driver 4301, the second support member 4200 moves the suction nozzle engaging structure 4100 to the engaging region 2001, or the second support member 4200 moves the suction nozzle engaging structure 4100 away from the engaging region 2001 and shields the suction nozzle engaging structure 4100 with the bearing member 2000.

Figure 15:
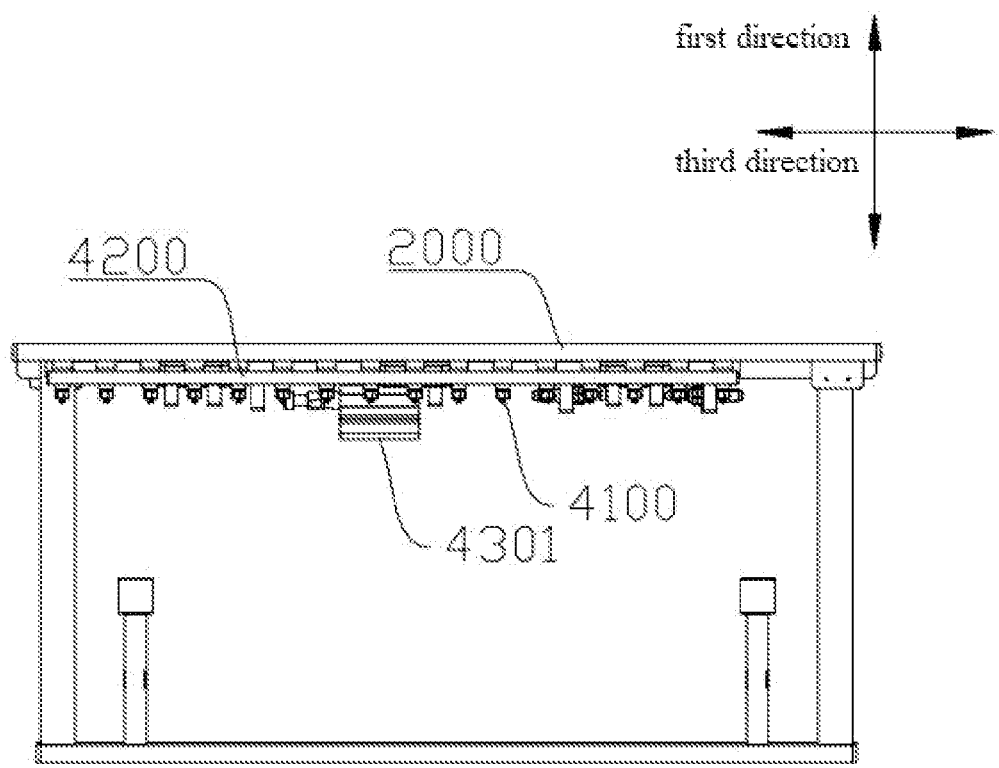
FIG. 15 is a structural schematic diagram of an assembly of a cleaning assembly and a bearing assembly.
Figure 16:
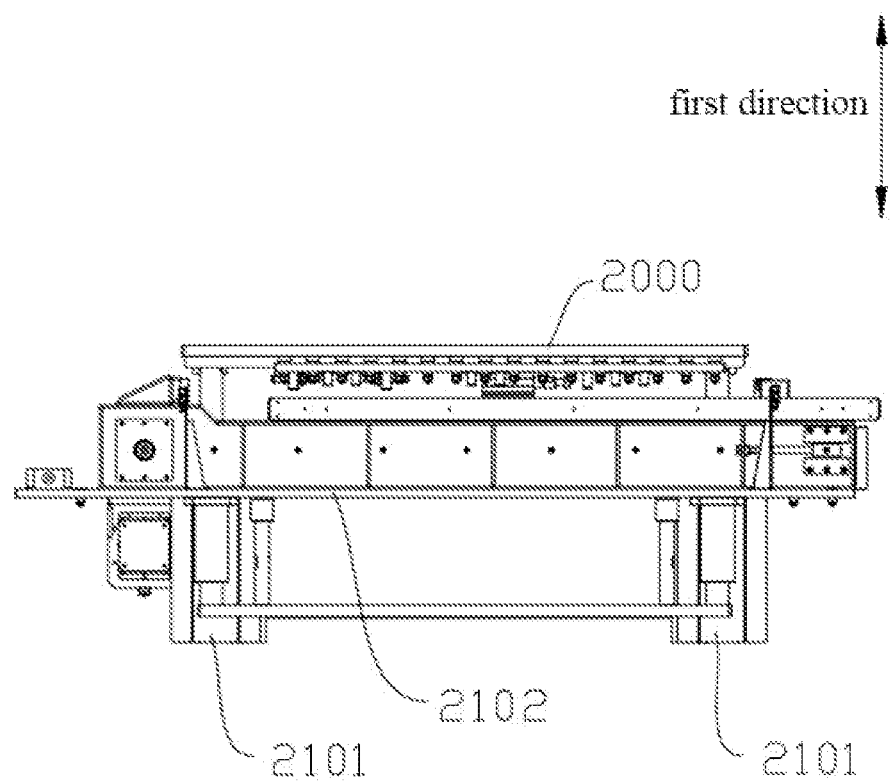
FIG. 16 is a structural schematic diagram of an assembly of a cleaning assembly in a device for assembly and disassembly.

Specifically, the translating driver 4301 is connected with the bearing member 2000, and the translating driver 4301 can be raised and lowered with the bearing member 2000. Referring to FIG. 15, the translating driver 4301 is positioned on the lower side of the bearing member 2000. Further, the translating driver 4301 includes a motor or a cylinder or a hydraulic cylinder.

In an embodiment, the cleaning assembly includes a translating guide structure 4302 connected to the bearing member 2000, the translating guide structure 4302 is positioned on the lower side of the bearing member 2000, the translating guide structure 4302 is disposed in a third direction, and the second support member 4200 is slidably connected with the translating guide structure 4302.

Figure 14:
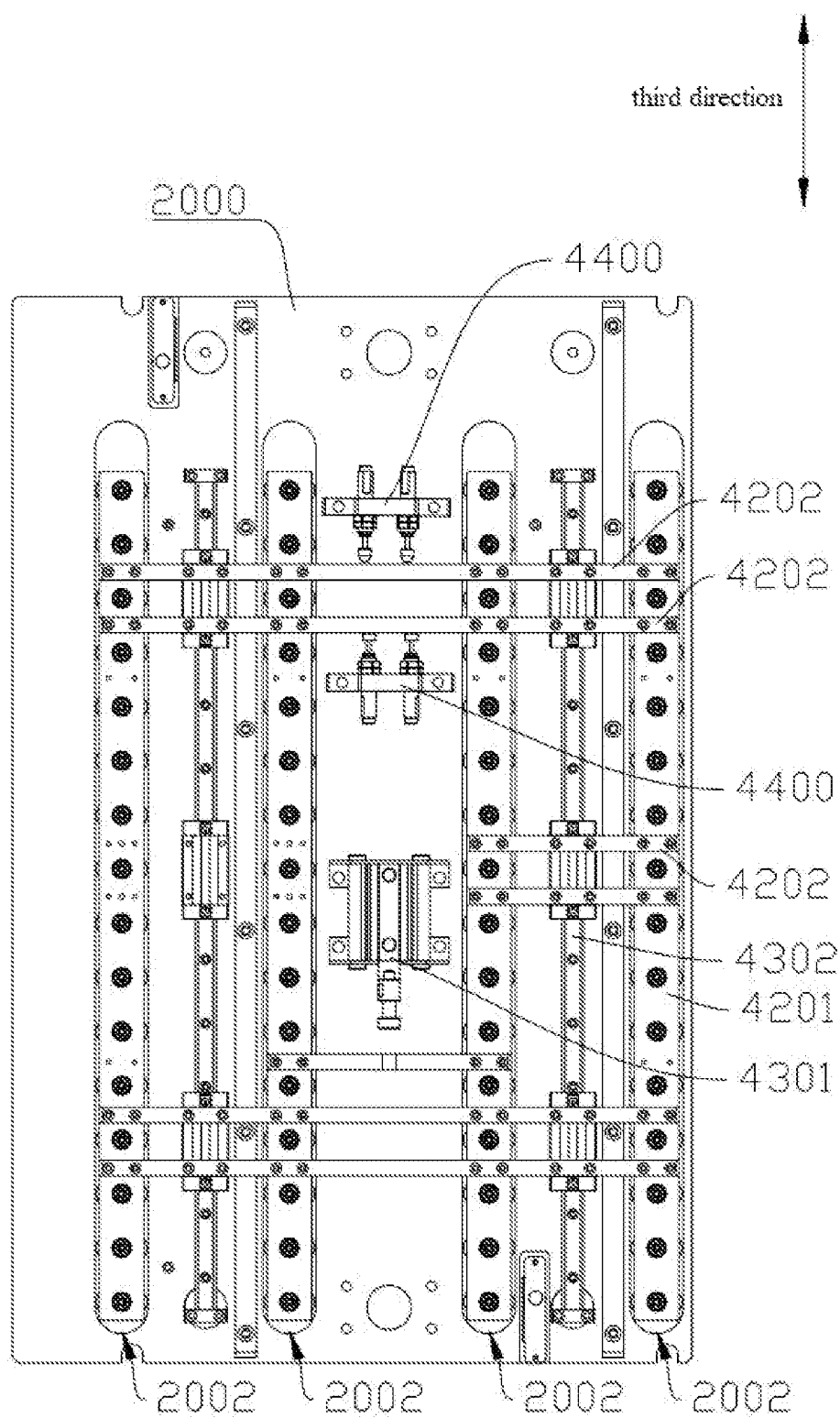
FIG. 14 is a structural schematic diagram of an lower side of a bearing member, which shows the bearing member is provided with a cleaning assembly.

Referring to FIG. 14, the translating guide structure 4302 includes a guide rail, and the second support member 4200 is slidably connected with the guide rail by a slider. Further, in order to smoothly move the second support member 4200, the translating guide structure 4302 is provided with at least two.

Alternatively, the translating guide structure 4302 may include a guide rod, and the second support member 4200 may be provided with a bushing or a linear bearing.

Figure 13:
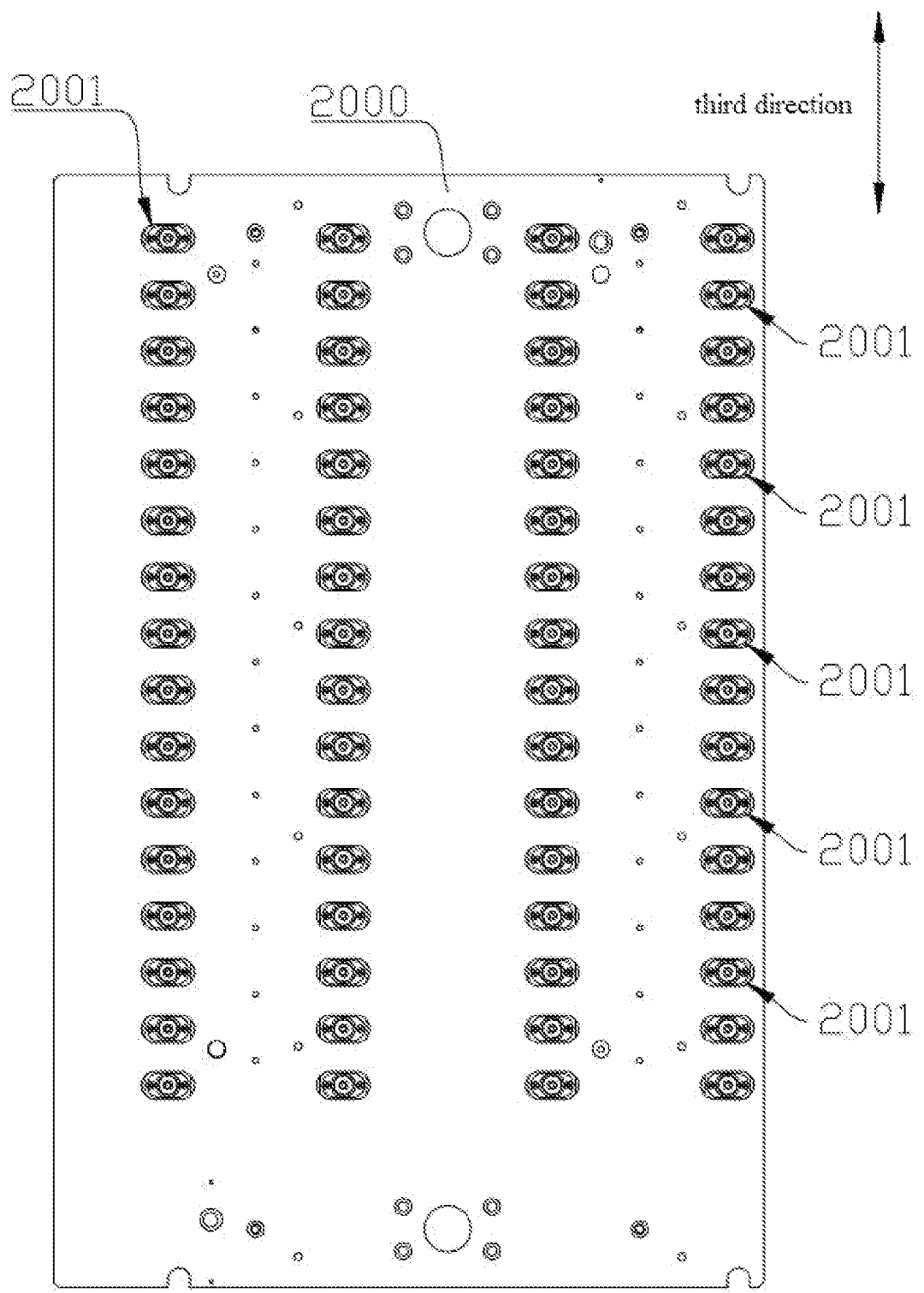
FIG. 13 is a structural schematic diagram of an upper side of a bearing member.

It should be understood that the suction nozzle engaging structures 4100 are provided with a plurality, and the suction nozzle engaging structures 4100 are arranged in an array. Accordingly, the engaging regions 2001 are provided with a plurality, and the engaging regions 2001 is arrayed on the bearing member 2000, as shown in FIG. 13.

In some examples, the second support member 4200 includes a suction nozzle mounting structure 4201 and a connecting member 4202, and the suction nozzle connecting structure is provided on the suction nozzle mounting structure 4201. Referring to FIG. 14, the suction nozzle mounting structure 4201 is provided with at least two, and the connecting member 4202 and the suction nozzle mounting structure 4201 are assembled into a frame-type support structure. Further, in order to make the second support member 4200 structurally firm, at least two connecting members 4202 are provided.

In an embodiment, the lower side of the bearing member 2000 is provided with a recessed region 2002, and the engaging region 2001 is positioned at the bottom of the recessed region 2002. The engaging region 2001 extends through the bottom of the recessed region 2002, and the suction nozzle engaging structure 4100 extends into the recessed region 2002. Specifically, under the actuation of the translating driver 4301, the suction nozzle engaging structure 4100 is moved in the recessed region 2002, and the suction nozzle engaging structure 4100 can be switched in position so that the suction nozzle engaging structure 4100 is moved to the engaging region 2001 or the suction nozzle engaging structure 4100 is moved away from the engaging region 2001.

It should be understood that the area of the recessed region 2002 is greater than the area of the engaging region 2001, so that the suction nozzle engaging structure 4100 is shielded by the bottom of the recessed region 2002. The side walls of the recessed region 2002 can protect the top of the suction nozzle engaging structure 4100 from contacting by an accident, and the recessed region 2002 can further prevent dust from entering the suction nozzle engaging structure 4100. It should be noted that in this case, the bottom of the recessed region 2002 is higher than the top of the suction nozzle engaging structure 4100.

In some examples, the recessed region 2002 extends along the translation direction of the suction nozzle engaging structure 4100 to define a recessed groove, and referring to FIG. 14, the recessed region 2002 extends in the third direction on the lower side of the bearing member 2000. It should be understood that at least two engaging regions 2001 are provided in the recessed region 2002, the engaging regions 2001 are arranged in at least one row in the recessed region 2002 along the translation direction of the suction nozzle engaging structure 4100. Referring to FIG. 14, the recessed region 2002 is provided with a row of engaging regions 2001 in the third direction, and the engaging regions 2001 are equally spaced.

Further, a plurality of recessed regions 2002 is formed on the lower side of the bearing member 2000 along the third direction, and the recessed regions 2002 are arranged side by side. It should be understood that, it is realized in this case to arrange the plurality of engaging regions 2001 on the bearing member 2000.

With respect to the recessed region 2002, it is also contemplated that, in some examples, one engaging region 2001 may be provided in the recessed region 2002. Further, a plurality of recessed regions 2002 are provided in an array on the lower side of the bearing member 2000.

In an embodiment, the cleaning assembly includes at least one abutting member 4400, and specifically, the abutting member 4400 is disposed at at least one end of both ends of a stroke in which the second support member 4200 is translated. It should be understood that the abutting member 4400 is connected with the bearing member 2000, the abutting member 4400 is provided on the lower side of the bearing member 2000, and the abutting member 4400 is used to abut the second support member 4200 to position the second support member 4200 being moved.

Specifically, the abutting member 4400 includes an oil pressure damper. On one hand, it is possible to limit the second support member 4200, and on the other hand, it is possible to buffer the second support member 4200.

Referring to FIG. 14, the abutting member 4400 is provided with two, and the two abutting members 4400 are positioned at both ends of the translation stroke, respectively. It should be understood that, during the second support member 4200 moving in the third direction to move the suction nozzle engaging structure 4100 toward the engaging region 2001, the second support member 4200 contacts with one of the abutting members 4400 to indicate that the suction nozzle engaging structure 4100 moves to the engaging region 2001, and that the suction nozzle engaging structure 4100 is in a position corresponding to the suction nozzle of the negative pressure assembly. At this time, the second support member 4200 stops moving. During the second support member 4200 moving reversely in the third direction to move the suction nozzle engaging structure 4100 away from the engaging region 2001, the second support member 4200 contacts with the other one of the abutting members 4400 to indicate that the suction nozzle engaging structure 4100 has been moved away from the engaging region 2001, and that the suction nozzle engaging structure 4100 is in a position where the bearing member 2000 blocks the suction nozzle engaging structure 4100. At this time, the second support member 4200 stops moving.

In some examples, a connecting member 4202 of the second support member 4200 can contact the abutting member 4400. In some examples, an alternative design is also provided in which the suction nozzle mounting structure 4201 can contact the abutting member 4400.

In an embodiment, the cleaning assembly includes a fluid guide assembly, and the fluid guide assembly includes a fluid guide engaging structure connected with the suction nozzle engaging structure 4100. Further, the fluid guide assembly includes a catheter that is configured as a hose, the fluid guide engaging structure is engaged with the catheter, the catheter is used to connect the cleaning liquid source, and the cleaning liquid is conveyed to the suction nozzle engaging structure 4100 through the catheter. The number of the fluid guide assemblies is consistent with the number of the suction nozzle engaging structures 4100.

Further, the cleaning assembly includes a cleaning liquid source. An alternative design is that the cleaning assembly does not include the cleaning liquid source, but that the cleaning liquid source additionally arranged by the users, thereby reducing the weight of the cleaning assembly, simplifying the structure of the cleaning assembly, and saving the manufacturing cost of the cleaning assembly.

In an embodiment, with respect to the protection of the suction nozzle engaging structure 4100 in the cleaning assembly, the cleaning assembly may also be designed such that the cleaning assembly includes a suction nozzle engaging structure 4100 and a shielding member, the bearing member 2000 is provided with a through-going engaging region 2001, and the suction nozzle engaging structure 4100 is positioned below the bearing member 2000. Further, the shielding member is slidably connected with the bearing member 2000. The shielding member serves to shield the suction nozzle engaging structure 4100 at the engaging region 2001, or the shielding member is removed from the engaging region 2001 to expose the suction nozzle engaging structure 4100.

It should be understood that in this case, the suction nozzle engaging structure 4100 is not translatable at the engaging region 2001, but instead that the engaging region 2001 is shielded or unshielded by a movable shielding member.

In some examples, in the case where a plurality of the engaging regions 2001 are provided, a plurality of the shielding members is provided correspondingly, and the shielding members are disposed corresponding to the positions of the engaging regions 2001. Specifically, each of the shielding members are provided as a baffle of a small area. Further, in order to move synchronously the shielding members, the shielding members are connected with the same moving member, and the moving member is connected to a motor or a cylinder or a hydraulic cylinder.

Alternatively, it may be designed that the shielding member is provided as a baffle of a large area, the shielding member is provided with a second avoidance region, the second avoidance region corresponds to the number and position of the engaging regions 2001, and the second avoidance region extends through the shielding member. It should be understood that, when the shielding member is translated to switch the positions, the second avoidance region is engaged with the engaging region 2001 to expose the suction nozzle engaging structure 4100 in the engaging region 2001, or the second avoidance region is offset from the engaging region 2001 to shield the engaging region 2001.

The present application is further described below combined with specific examples, it should be noted that the following description is illustrative and not intended to be a specific limitation on the application.

The operation flow of the tray and the negative pressure assembly in the device for assembly and disassembly includes: S1, feeding the tray into the device for assembly and disassembly; S2, engaging the battery with the suction nozzle of the negative pressure assembly; S3, separating the locking assembly 1100 from the negative pressure assembly, and latching the negative pressure assembly with the tray; S4, checking airtightness; S5, withdrawing the tray connected with the negative pressure assembly from the device for assembly and disassembly; S6, feeding the tray connected with the negative pressure assembly back to the device for assembly and disassembly; S7, supporting the negative pressure assembly by the locking assembly 1100, and unlatching the negative pressure assembly from the tray; S8, separating the battery from the negative pressure assembly, separating the negative pressure assembly from the tray, and withdrawing the tray from the device for assembly and disassembly; S9, cleaning the negative pressure assembly; S10, returning the bearing member 2000 and the negative pressure assembly to the initial position.

The detailed operation flow is as follows.

In S1, the tray carrying the battery is conveyed to the bearing member 2000 by the transporting assembly 6000, the blocking member 2300 abuts against the tray, the transporting assembly 6000 stops running, and the tray is positioned above the bearing member 2000.

In S2, the raising assembly raises the bearing member 2000 so that the bearing member 2000 continues to raise the tray, the battery is engaged with the suction nozzle of the negative pressure assembly, and the tray abuts against the negative pressure assembly. At this time, the latching connection end 3201 of the second connection structure 3200 extends into the latching region 3101 of the first connection structure 3100, and the avoidance section 3303 of the movable connection structure 3300 enters the latching connection region 3202 of the latching connection end 3201.

In S3, the locking driver 1101 is activated, the latching connection structure 1102 is moved away from the negative pressure assembly, the locking connection structure 1102 drives the movable connection structure 3300, and the fasten section 3302 of the movable connection structure 3300 is moved to the locking connection region 3202, so that the support structure of the locking connection structure 1102 is separated from the negative pressure assembly, while the negative pressure assembly and the tray are latched and connected by the latching assembly.

In S4, the airtightness detecting assembly 5000 checks the airtightness of the chamber defined by engaging the negative pressure assembly with the battery.

In S5, under actuation of the raising assembly, the bearing member 2000 is lowered until the tray comes into contact with the transporting assembly 6000, and the transporting assembly 6000 conveys the tray connected with the negative pressure assembly out from the device for assembly and disassembly. The tray and the negative pressure assembly are conveyed out to other equipment for other processes, such as battery grading and battery formation, including but not limited to standing or charging and discharging.

In S6, the tray connected the negative pressure assembly is fed back to the device for assembly and disassembly via the transporting assembly 6000, and the blocking member 2300 abuts against the tray.

In S7, the raising assembly raises the bearing member 2000 so that the bearing member 2000 rises the tray and the negative pressure assembly, and the lower end of the stopper 1200 abuts against the bearing member 2000 or the negative pressure assembly. At this time, the side of the connecting section 3304 at the abutting region 3301 on the movable connection structure 3300 is in contact with the inner wall of the locking fasten region 1103 on the locking connection structure 1102.

When the locking driver 1101 is activated, the locking connection structure 1102 moves close to the negative pressure assembly, the locking connection structure 1102 drives the movable connection structure 3300, and the avoidance section 3303 of the movable connection structure 3300 moves to the locking connection region 3202, so that the support structure is connected to the negative pressure assembly, and the negative pressure assembly and the tray are unlatched.

In S8, under the actuation of the raising assembly, the bearing member 2000 is lowered, the battery is separated from the suction nozzle of the negative pressure assembly, the negative pressure assembly is separated from the tray, the tray is in contact with the transporting assembly 6000, and the transporting assembly 6000 conveys the tray out.

In S9, the raising assembly drives the bearing member 2000 to rise, the first drive assembly drives the first support member 1000 to fall, the cleaning assembly and the negative pressure assembly are close to each other, and the suction nozzle engaging structure 4100 is engaged with the suction nozzle of the negative pressure assembly to complete cleaning of the negative pressure assembly.

In S10, the bearing member 2000 is lowered, the first support member 1000 is raised, the cleaning assembly and the negative pressure assembly are separated, and the bearing member 2000 and the negative pressure assembly are respectively returned to the initial position.

It should be noted that in S9, under the actuation of the translating driver 4301, the suction nozzle engaging structure 4100 is moved to the engaging region 2001, or the suction nozzle engaging structure 4100 is moved away from the engaging region 2001.

The description provided by the above steps is merely intended to help in understanding the methods, structures, and core concepts of the present application. To those of ordinary skill in the art, several modifications and changes may be made to the present application without departing from the principles of the present application, which also fall within the scope of the claims of the present application.

What is claimed is:

1. A device for assembly and disassembly, comprising:
a support assembly, wherein the support assembly comprises a first support member and a locking assembly, the locking assembly comprises a locking driver and a locking connection structure, the locking driver is connected with the first support member, the locking connection structure is connected with the locking driver, the locking connection structure is configured to support a negative pressure assembly, and connection between the locking connection structure and the negative pressure assembly is separable;

a bearing assembly, wherein the bearing assembly comprises a bearing member for carrying a tray, the bearing member is positioned below the first support member, at least one of the bearing member and the first support member is raised and lowered in a first direction; and a latching assembly, wherein the latching assembly comprises a first connection structure configured to connect with the negative pressure assembly, a second connection structure configured to connect with the tray, and a movable connection structure movably connected with the first connection structure; the first connection structure is latched with the second connection structure through the movable connection structure, and the movable connection structure is unlatchable from the second connection structure;

wherein under actuation of the locking driver, the locking connection structure is movable in a second direction, and the locking connection structure drives the movable connection structure to move in the second direction, and the movable connection structure is separable from the locking connection structure; wherein the locking connection structure is separated from the negative pressure assembly while the movable connection structure is latched with the second connection structure, or the locking connection structure is connected to the negative pressure assembly while the movable connection structure is unlatched from the second connection structure.

2. The device for assembly and disassembly of claim 1, wherein the movable connection structure is provided with an abutting region on a side of the movable connection structure, and in a case that the locking connection structure is connected to the movable connection structure, the locking driver exerts a force on the abutting region through the locking connection structure to move the movable connection structure.

3. The device for assembly and disassembly of claim 2, wherein the locking connection structure is provided with a locking fasten region, and the locking fasten region is recessed on the locking connection structure.

4. The device for assembly and disassembly of claim 1, wherein the first connection structure is provided with a recessed latching region, the second connection structure is provided with a latching connection end, the latching connection end is provided with a recessed latching connection region, the latching connection end is extendable into the latching region in the first direction, and the movable connecting structure is fastened with an inner wall of the latching connection region or separated from the latching connection region.

5. The device for assembly and disassembly of claim 4, wherein the latching connection region extends through the latching connection end in the second direction, a side wall of the latching connection region is provided with a first avoidance region, and the first avoidance region extends through the side wall of the locking connection region, wherein in a case that the latching connection end is separated from the latching region in the first direction, the movable connection structure is separated from the second connection structure through the first avoidance region.

6. The device for assembly and disassembly of claim 5, wherein the movable connecting structure comprises a fasten section and an avoidance section, the fasten section is connected with the avoidance section, the fasten section has a diameter greater than a diameter of the avoidance section, the fasten section is fastened with the inner wall of the latching connection region, and the avoidance section is separable from the first avoidance region; wherein the movable connection structure moves in the second direction to move the fasten section to the latching connection region or the avoidance section to the latching connection region.

7. The device for assembly and disassembly of claim 6, wherein the latching assembly comprises an elastic member connected to the movable connection structure, the elastic member exerts a reverse elastic force on the movable connection structure in a case that the avoidance section is moved in the second direction toward the latching connection region.

8. The device for assembly and disassembly of claim 1, wherein the locking connection structure is provided with a support structure configured to support the negative pressure assembly, and the support structure is recessed on the locking connection structure.

9. The device for assembly and disassembly of claim 1, wherein the device comprises a stopper, an upper end of the stopper abuts against the first support member or a lower end of the stopper abuts against one of the negative pressure assembly, the tray and the bearing member in a case that the tray and the negative pressure assembly is raised as a whole to a position for unlatching.

10. The device for assembly and disassembly of claim 1, wherein the device comprises a cleaning assembly connected with the bearing member, the cleaning assembly comprises a suction nozzle engaging structure positioned below the bearing member, the bearing member is provided with an engaging region, and the engaging region extends through the bearing member; wherein at the engaging region, the suction nozzle of the negative pressure assembly is engaged with the suction nozzle engaging structure.

11. The device for assembly and disassembly of claim 10, wherein the cleaning assembly comprises a second support member and a translating driver, the suction nozzle engaging structure is connected with the second support member, the second support member is positioned on a lower side of the bearing member, the second support member is slidably connected with the bearing member, the second support member is connected with the translating driver, and translating driver is connected with the bearing member; wherein under an actuation of the translating driver, the second support member moves the suction nozzle engaging structure to the engaging region or the second support member moves the suction nozzle engaging structure away from the engaging region.

12. The device for assembly and disassembly of claim 11, wherein the cleaning assembly comprises a translating guide structure connected with the bearing member, the translating guide structure is positioned on the lower side of the bearing member, and the second support member is slidably connected with the translating guide structure.

13. The device for assembly and disassembly of claim 10, wherein the engaging region includes a plurality of engaging regions, and the engaging regions are arranged in an array on the bearing member; wherein the suction nozzle engaging structure includes a plurality of suction nozzle engaging structures, and the suction nozzle engaging structures are arranged in an array.

14. The device for assembly and disassembly of claim 11, wherein the lower side of the bearing member is provided with a recessed region, the engaging region is positioned at bottom of the recessed region, and the suction nozzle engaging structure extends into the recessed region; wherein under actuation of the translating driver, the suction nozzle engaging structure moves in the recessed region to move the suction nozzle engaging structure to the engaging region or move the suction nozzle engaging structure away from the engaging region.

15. The device for assembly and disassembly of claim 14, wherein the recessed region extends in a translation direction of the suction nozzle engaging structure to define a recessed groove, the recessed region is provided with at least two engaging regions, and the engaging regions are arranged in at least one row in the recessed region along the translation direction of the suction nozzle engaging structure.

16. The device for assembly and disassembly of claim 10, wherein the cleaning assembly comprises a shielding member slidably connected with the bearing member, the shielding member is configured to shield the suction nozzle engaging structure at the engaging region, or the shielding member is configured to move away from the engaging region to expose the suction nozzle engaging structure.

17. The device for assembly and disassembly of claim 2, wherein the device comprises a stopper, an upper end of the stopper abuts against the first support member or a lower end of the stopper abuts against one of the negative pressure assembly, the tray and the bearing member in a case that the tray and the negative pressure assembly is raised as a whole to a position for unlatching.

18. The device for assembly and disassembly of claim 3, wherein the device comprises a stopper, an upper end of the stopper abuts against the first support member or a lower end of the stopper abuts against one of the negative pressure assembly, the tray and the bearing member in a case that the tray and the negative pressure assembly is raised as a whole to a position for unlatching.

19. The device for assembly and disassembly of claim 2, wherein the device comprises a cleaning assembly connected with the bearing member, the cleaning assembly comprises a suction nozzle engaging structure positioned below the bearing member, the bearing member is provided with an engaging region, and the engaging region extends through the bearing member; wherein at the engaging region, the suction nozzle of the negative pressure assembly is engaged with the suction nozzle engaging structure.

20. The device for assembly and disassembly of claim 3, wherein the device comprises a cleaning assembly connected with the bearing member, the cleaning assembly comprises a suction nozzle engaging structure positioned below the bearing member, the bearing member is provided with an engaging region, and the engaging region extends through the bearing member; wherein at the engaging region, the suction nozzle of the negative pressure assembly is engaged with the suction nozzle engaging structure.

* * * * *